Dec. 8, 1964     J. H. SLAYTER     3,159,882
BUILDING CONSTRUCTION
Filed June 12, 1962                            2 Sheets-Sheet 1
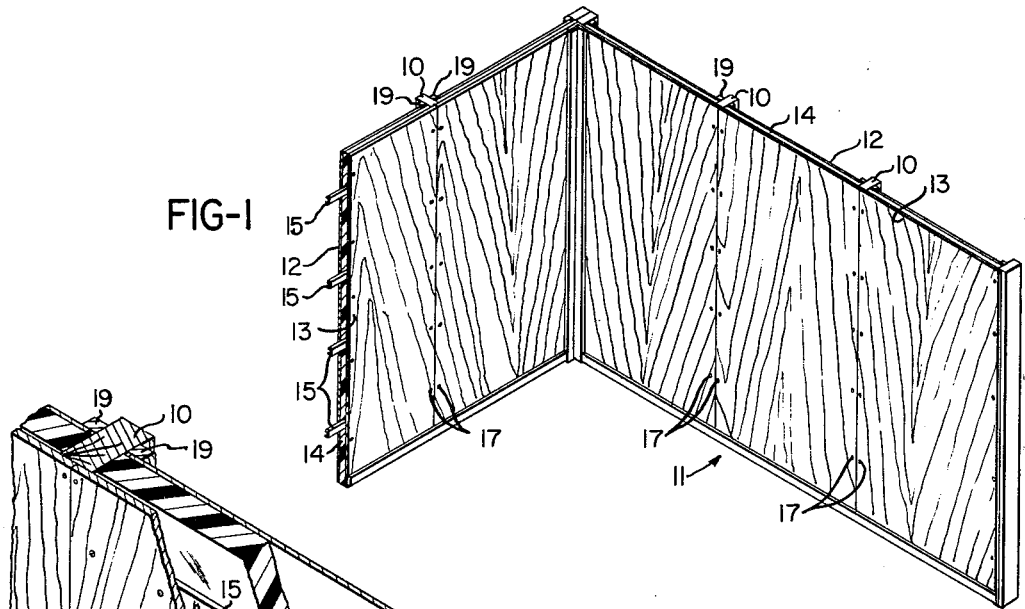
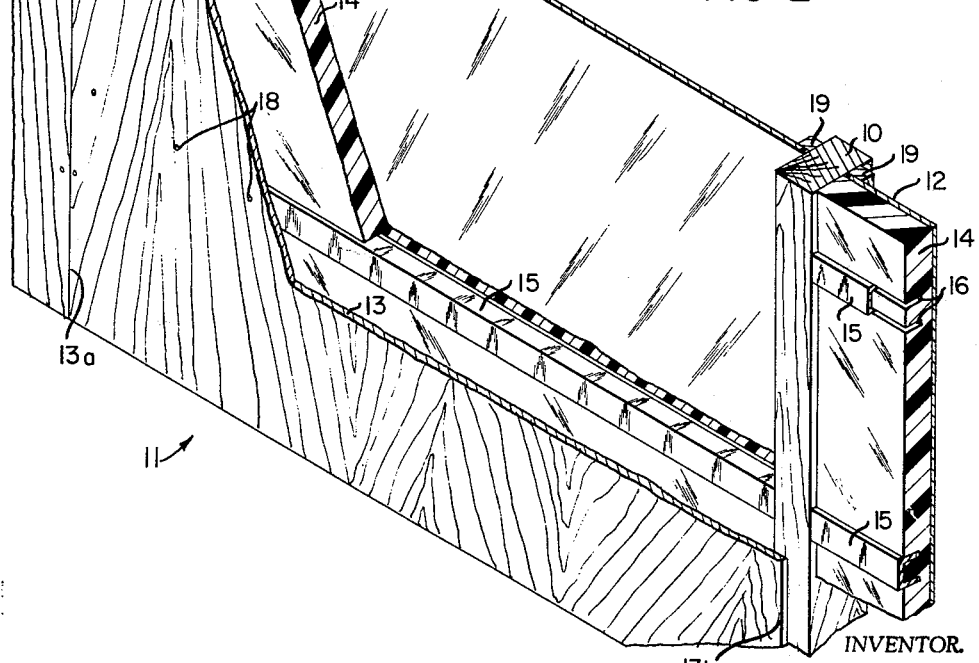
INVENTOR.
JOHN H. SLAYTER
BY MAHONEY, MILLER & RAMBO Dec. 8, 1964    J. H. SLAYTER    3,159,882
BUILDING CONSTRUCTION
Filed June 12, 1962    2 Sheets-Sheet 2
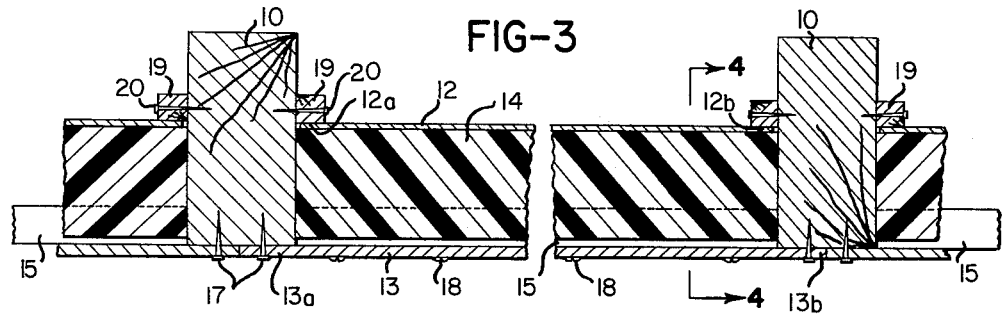
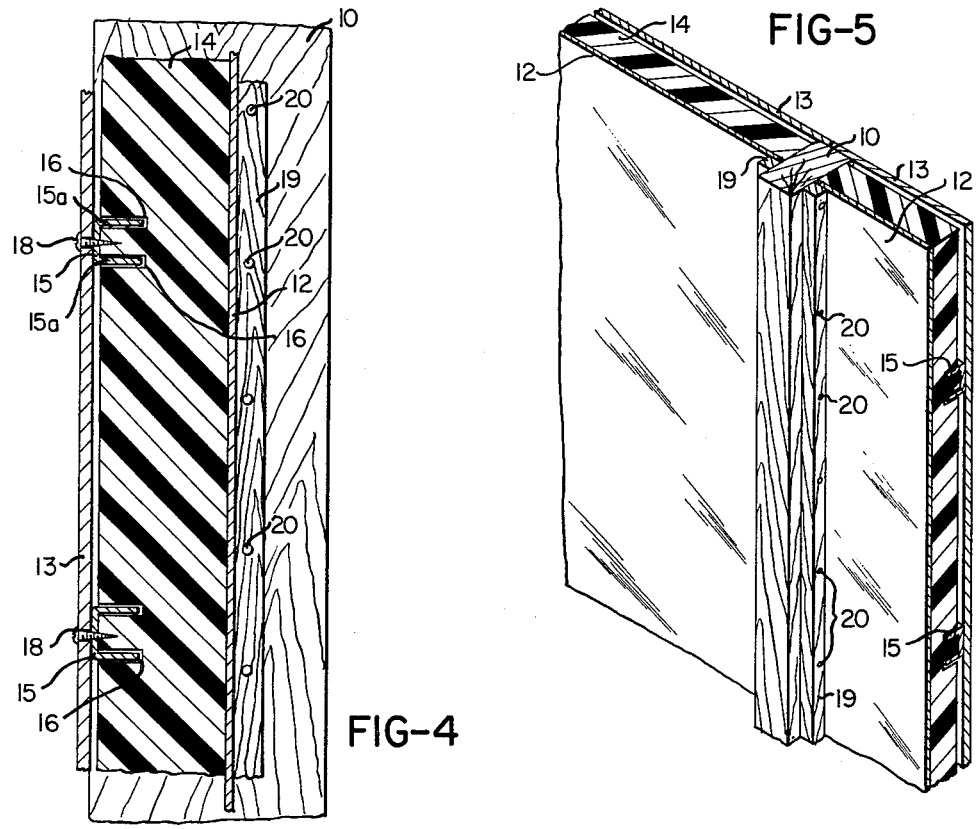
INVENTOR.
JOHN H. SLAYTER
MAHONEY, MILLER & RAMBO
BY  Wm. V. Miller

United States Patent Office 3,159,882
Patented Dec. 8, 1964

---

3,159,882
BUILDING CONSTRUCTION
John H. Slayter, P.O. Box 431, Newark, Ohio
Filed June 12, 1962, Ser. No. 201,916
3 Claims. (Cl. 20—4)

This invention relates generally to building construction. It relates, more specifically, to a prefabricated, wall-forming panel construction for a building structure having a movably mounted skin member.

It is a current practice in the construction of buildings, particularly those of the prefabricated type, to utilize thermally insulated panels in the construction of walls or other portions of a building structure. A panel, typical of the type heretofore utilized, comprises in general two spaced parallel skin members having an interposed thermal insulation member. The insulation member may be of any material possessing the desired thermal insulating properties and capable of being formed as a rigid, self-supporting panel. Bonding the skin members to opposed surfaces of the insulation panel produces a unitary panel construction. Such a unitary panel may be readily attached to frame members of the building structure thereby effecting a substantial reduction in cost of fabrication and installation over the conventional building constructions utilizing wall coverings fabricated at the construction site. However, the previous unitary panel constructions have been found to be unsatisfactory in applications where a substantial temperature differential may be encountered between the opposite sides of the panel or where the skin members are fabricated from dissimilar materials having different coefficients of expansion. An example of the temperature differential application is in the construction of the exterior walls of a building. In such an application the interior skin member is maintained at a relatively constant temperature while the exterior skin member is subjected to the widely varying temperatures of the atmosphere. Consequently, the exterior skin member will expand and/or contract in accordance with the temperature variation while the interior skin member does not appreciably expand or contract. Since the skin members are bonded to the insulation panel, the result is a distortion similar to that of a bimetal temperature sensing element. The unitary panel will tend to cup outward when the outer skin member expands and to cup inward when the outer skin member contracts. Although the material from which the insulation panels are fabricated are characteristically resilient, the resiliency is not sufficient to absorb the entire expansion or contraction. The distortion is also present where the skin members are fabricated from materials having different coefficients of expansion but there is no temperature differential. Fastening the panels rigidly to the building structure further increases the distortion effect.

It is, therefore, the primary object of this invention to provide a panel construction for a building structure having a movably mounted skin member which substantially prevents distortion of the panel resulting from temperature differentials.

It is another object of this invention to provide a panel construction for a building structure having an exterior skin member with a thermal insulation panel bonded thereto supported in spaced parallel relationship to an interior skin member by a supporting member secured to the interior skin member wherein the exterior skin member is relatively movable in a plane parallel to the interior skin member.

It is a further object of this invention to provide a panel construction having an exterior skin member provided with a resilient, thermal insulation panel bonded to a surface thereof movably supported on a building structure by a plurality of channel members rigidly secured to the building structure which are engaged with the insulation panel.

It is also an object of this invention to provide an economically fabricated panel construction having a movably mounted skin member which may be readily installed in a building structure with a minimum expenditure of labor.

These and other objects and advantages of this invention will be readily apparent from the following detailed description of an embodiment thereof and the accompanying drawings:

In the drawings:
FIGURE 1 is a perspective view of a portion of a building structure utilizing the panel construction of the invention.
FIGURE 2 is an enlarged perspective view of a fragmentary section of the building structure with portions of the panel broken away.
FIGURE 3 is an enlarged horizontal sectional view of a section of the building structure.
FIGURE 4 is a fragmentary vertical sectional view taken along line 4—4 of FIGURE 3.
FIGURE 5 is an enlarged perspective view of a fragmentary section of the building structure showing the exterior thereof.

Referring to the drawings, a section of a building structure, utilizing the panel construction of this invention, is illustrated in FIGURE 1. The section shown is a portion of a vertically disposed wall; however, it is to be understood that the panel construction of this invention is not limited in its application to building walls. A typical wall includes a supporting framework having a plurality of vertically extending, spaced parallel frame members 10. Each frame member 10 is usually secured at each end thereof to other members of the building structure by conventional fastening means (not shown). A plurality of panels, denoted generally by the numeral 11, are secured to the frame members 10 to form a continuous wall surface. Each panel is normally prefabricated to reduce construction costs and includes a first skin member 12 for the exterior of the building and a second skin member 13 for the interior. A thermal insulating material is customarily disposed between the two skin members 12 and 13 to reduce heat transfer.

In accordance with this invention, each panel 10 is constructed with the skin members 12 and 13 separately fabricated for installation. The first or exterior skin member 12 consists of a flat, rectangular sheet of material having opposed parallel edges, 12a and 12b. Preferably, the skin member 12, which extends substantially the length of the frame members 10, is disposed between two adjacent frame members with each of the edges 12a and 12b extending parallel to a surface of the respective frame member. Preferably, the width of the skin member 12 is substantially less than the spacing between the frame members 10 as shown in FIGURE 3 to prevent transverse buckling when the skin member expands. As shown in the drawings, the skin member 12 is positioned intermediate the edge portions of the frame member. The skin member 12 may be of a width greater than frame member spacing and positioned with the edges 12a and 12b in overlying relationship to the edge portions of the frame members 10. The skin members 12 are not secured to the frame members 10 thus permitting relative movement in accordance with expansion or contraction resulting from variations of the environmental temperatures, and such movement is in no way transmitted to the frame members or the interior skin member 13.

Bonded to a surface of the first skin member 12 is a flat, rectangular panel 14 fabricated from a thermal insulating material. The insulating material may be any of the well-known types possessing the desired thermal insulating properties which are capable of being formed as a rigid, self-supporting panel. For example, the synthetic thermosetting polystyrenes may be formed in sheets with numerous air spaces, this material being commonly known as polystyrene foam. Insulation panels fabricated accordingly, although rigid, when not subjected to stress, possess resilient characteristics which permit the first skin member 12 to expand and/or contract without distortion when the insulation panel 14 is supported at spaced intervals.

An exterior skin member 12 with the insulation panel 14 bonded thereto disposed between two adjacent frame members 10 is, as shown in the drawings, supported vertically by a plurality of channel form supporting members 15. Each channel member 15 includes a pair of spaced flanges 15a and is disposed transversely of the frame members 10 and is rigidly fixed in an appropriate position. The number of channels utilized per panel will vary according to the specific installation although four such channels are shown in FIGURE 1 which are uniformly vertically spaced. Formed in the exposed surface of the insulating panel 14 are pairs of transversely extending slots 16 which are relatively spaced to receive the flanges 15a of the channels. Preferably, the thickness of the insulation panel 14 is substantially greater than the width of the flanges 15a in order that the flanges will be fully received by the slots 16 but the slots will not extend completely through the insulation panel. The channels, therefore, will not be in contact with the exterior skin member 12 and are not affected by the temperature differentials to which the exterior skin member may be subjected.

The supporting members 15 may also be of T-form or L-form if desired. A T-form supporting member would be disposed with the web thereof adjacent the insulation panel 14 for engaging a slot formed in the surface thereof. For either a T- or L-form member, it would only be necessary to form one slot in the insulation panel to receive the web or flange thereof for each supporting member utilized.

With the channels 15 properly fixed in their respective positions, the skin member 12 with the insulation panel 14 bonded thereto is installed by merely engaging the flanges 15a with the respective slots 16 in the insulation panel 14, or the flanges may be forced into the soft insulating material without previously forming slots. Thus, for a building wall, the exterior skin member 12 is vertically supported by the insulation panel 14 on the channels 15. As the skin member 12 expands or contracts in accordance with temperature variations, it will move freely in a vertical plane and distort the insulation panel 14. The effect of the distortion, however, is localized at the channels 15 which permit the insulation panel to expand or contract in accordance with the skin member 12. Although the insulation panel is fabricated from a resilient material, the degree of resiliency is usually not sufficient to absorb the expansion or contraction of the skin member when the exposed surface of the insulation is rigidly fixed as in the prior panel constructions where the interior skin member is also bonded to the insulation. In the present panel construction, the insulation panel 14 is also free to move over the entire surface thereof except for the localized restriction at the channels 15. Since the channels 15 restrict only a relatively small portion of the insulation panel 14, the distortion forces are concentrated at the channels which prevents distortion of the exterior skin member.

In the present embodiment, the channel supporting members 15 are secured in their respective positions to a surface of the interior skin member 13. Each interior skin member 13 also consists of a flat, rectangular sheet of material having opposed marginal edges 13a and 13b. Preferably, the skin members extend substantially the length of the frame members 10 and are of a width to position each of the marginal edges 13a and 13b in overlying relationship to an edge portion of a frame member. Thus, the edges of adjacent skin members may be placed in contacting engagement to form a continuous interior wall surface as shown best in FIGURE 1. The interior skin members 13 are rigidly secured to the frame members 10 by any suitable fastening means, such as a plurality of common nails 17 as best shown in FIGURES 2 and 3. The channels 15 are secured to the skin member by a plurality of sheet metal screws 18 (see FIGURE 4) extending through apertures formed in the skin member and threaded into a web of the channel or in any other suitable manner. Since the channel members 15 are not subjected to the temperature differentials of the exterior skin member 12 as previously indicated, they will remain at substantially the same temperature of the interior skin member 13 and thereby prevent distortion.

The channel members 15 may be secured directly to the frame members 10 if desired for supporting the insulation panel 14 and the exterior skin member 12. This type of installation could be advantageously utilized where the interior skin member is not suitable for supporting the channels or an interior skin member is not required. In this instance, each end of a channel may be secured to an edge portion of a frame member or to a surface thereof intermediate the edge portion.

As the exterior skin member 12 and the insulation panel 14 are not rigidly secured to the frame members 10, a pair of retaining members 19 are provided for each panel. As shown best in FIGURES 3, 4 and 5, the retaining members 19 are elongated bars or stops of rectangular cross-section which extend substantially the length of the exterior skin member 12. When the insulation panel 14 is properly positioned in engagement with the channel members 15, each retaining member 19 is positioned with one surface in contacting engagement with the outer surface of the skin member 12 and is secured to a frame member 10, for example, by a plurality of nails 20. The retaining members 19 do not restrict the movement of the exterior skin member and only serve to maintain the insulation 14 in engagement with the channel members 15.

Both skin members 12 and 13, exterior and interior, respectively, may be fabricated from the same materials or dissimilar materials. For example, the materials utilized may be wood, metal or a synthetic, thermosetting resin suitable for forming sheets. Distortion of a panel constructed in accordance with this invention will not occur when a temperature differential exists between the skin members or if the skin members possess different coefficients of expansion.

It is readily apparent that the panel construction for a building structure provided by this invention does not distort as a result of temperature variation. Such a panel construction may be readily fabricated in a factory for economical installation at the building structure construction site. Each panel is quickly installed by simply fastening the interior skin member with the attached channels to the building frame members and engaging the insulation panel therewith. The retaining members assure that the insulation panel remains in engagement with the channels to support the exterior skin member for movement in accordance with temperature variations.

According to the provisions of the patent statutes, the principles of this invention have been explained and has been illustrated and described in what is now considered to represent the best embodiment. However, it is to be understood that, within the scope of the appended claims, the invention may be practiced otherwise than as specifically illustrated and described.

Having thus described this invention, what is claimed is:
1. A building wall structure comprising a pair of elongated, relatively laterally-spaced, parallel frame members, said frame members being of selected depth between opposed inner and outer edges; an outer panel skin member mounted between and within the pair of adjacent frame members having inner and outer faces and having opposed longitudinal side edges disposed adjacent said frame members; stops extending longitudinally of said frame members and secured thereto outwardly of the outer face of said skin member with the skin member free of said stops to permit longitudinal movement of the edges of the skin member relative to the adjacent frame members but to retain the skin member inwardly of the outer edges and within the depth of said frame members; an insulating body having an inner face and having an outer face bonded to the inner face of said outer skin member with longitudinal edges disposed within the frame members and free thereof to permit longitudinal movement of said insulating body edges relative to the adjacent frame members, an inner panel skin member inwardly of said frame members having inner and outer faces with its outer face attached to the inner edges of the frame members; and means for connecting said inner skin member to said insulating body to permit relative longitudinal movement therebetween; said means comprising channel members extending transversely between said frame members which are secured to the outer face of said inner skin member at longitudinally spaced intervals and which have flanges which project outwardly into receiving transverse slots in the inner face of said insulating body which extend partly through said body.

2. A building wall structure comprising a pair of elongated, relatively laterally-spaced, parallel frame members, said frame members being of selected depth between opposed inner and outer edges; an outer panel skin member mounted between and within the pair of adjacent frame members having inner and outer faces and having opposed longitudinal side edges disposed adjacent said frame members; stops extending longitudinally of said frame members and secured thereto outwardly of the outer face of said skin member with the skin member free of said stops to permit longitudinal movement of the edges of the skin member relative to the adjacent frame members but to retain the skin member inwardly of the outer edges and within the depth of said frame members; an insulating body having an outer face adjacent to the inner face of said outer skin member with the body secured to said outer skin member and with longitudinal edges disposed within the frame members and free thereof to permit longitudinal movement of said insulating body edges relative to the adjacent frame members, an inner panel skin member inwardly of said frame members having inner and outer faces with its outer face attached to the inner edges of the frame members; and means for connecting said inner skin member to said insulating body to permit relative longitudinal movement therebetween; said means comprising supporting members extending transversely between said frame members which are fixed relative thereto at longitudinally spaced intervals and which have flanges that project outwardly into receiving transverse slots in the inner face of said insulating body which extend partly through said body.

3. A building structure comprising a pair of elongated, relatively laterally-spaced, parallel frame members, said frame members being of selected depth between opposed edges; a first panel skin member mounted between and within the pair of adjacent frame members having opposed faces and having opposed longitudinal side edges disposed adjacent said frame members; stops extending longitudinally of said frame members and fixed thereon outwardly of the adjacent face of said skin member with the skin member slidably retained by said stops within the depth of said frame members, an insulating body having opposed faces with longitudinal edges disposed within the frame members and free thereof to permit longitudinal movement of said insulating body edges relative to the adjacent frame members and with the body secured to said skin member, a second panel skin member secured to said frame members having opposed faces with its one face attached to the adjacent edges of the frame members; and means for connecting said second skin member to said insulating body to permit relative longitudinal movement therebetween; said means comprising supporting members extending transversely between said frame members which are fixed relative thereto at longitudinally spaced intervals and which have portions projecting into receiving sockets in the adjacent face of said insulating body.

References Cited by the Examiner

UNITED STATES PATENTS

| | | | |
|---|---|---|---|
| 2,100,624 | 11/37 | Beckwith | 189—34 X |
| 2,230,349 | 2/41 | Eaton | 20—4 |
| 2,302,047 | 11/42 | Olsen | 20—4 X |
| 3,026,577 | 3/62 | Dosker | 50—434 X |

FOREIGN PATENTS 1,002,075 10/51 France.

EARL J. WITMER, *Primary Examiner.*
JACOB L. NACKENOFF, *Examiner.*